(12) United States Patent
Glick et al.

(10) Patent No.: US 9,774,093 B2
(45) Date of Patent: Sep. 26, 2017

(54) AUTOMATED REFLECTOR TUNING SYSTEMS AND METHDOS

(71) Applicant: The Boeing Company, Chicago, IL (US)

(72) Inventors: Gary L. Glick, Rolling Hills Est., CA (US); Joel Mendoza, Sylmar, CA (US); Jerry D. Macfarlane, Rancho Palos Verdes, CA (US); Richard A. Bingman, Orange, CA (US); David W. Ross, Long Beach, CA (US); David R. Mahakian, Huntington Beach, CA (US); Adam L. Griswold, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 110 days.

(21) Appl. No.: 14/664,382

(22) Filed: Mar. 20, 2015

(65) Prior Publication Data

US 2016/0276750 A1 Sep. 22, 2016

(51) Int. Cl.
*H01Q 15/14* (2006.01)
*G01C 11/00* (2006.01)
*H01Q 15/16* (2006.01)

(52) U.S. Cl.
CPC ........... *H01Q 15/147* (2013.01); *G01C 11/00* (2013.01); *H01Q 15/16* (2013.01)

(58) Field of Classification Search
CPC ............................ H01Q 15/147; H01Q 15/14
See application file for complete search history.

(56) References Cited

U.S. PATENT DOCUMENTS

| | | | | |
|---|---|---|---|---|
| 7,532,333 B2 * | 5/2009 | Haeusler | ............ | G01B 11/2545 356/601 |
| 8,803,761 B2 * | 8/2014 | Baudasse | ................ | H01Q 3/01 343/912 |
| 9,203,156 B2 * | 12/2015 | Yi | ........................ | H01Q 15/147 |
| 9,337,544 B2 * | 5/2016 | Theunissen | ............ | H01Q 15/14 |
| 9,368,876 B2 * | 6/2016 | Brossier | ................ | H01Q 1/288 |
| 2015/0145726 A1 * | 5/2015 | Stambovsky | ........ | H01Q 15/147 342/385 |

FOREIGN PATENT DOCUMENTS

DE WO 2007115621 A2 * 10/2007 ............. G01B 11/25

* cited by examiner

*Primary Examiner* — Hoang Nguyen
(74) *Attorney, Agent, or Firm* — Haynes and Boone, LLP (57) ABSTRACT

Methods, apparatus, and systems for automated reflector tuning include combining high precision automated photogrammetric measurement with high precision servo actuator positioning control of a reflector surface using custom optimizing control software to produce a novel, fully automated satellite reflector alignment tuning system. Precise adjustment to the shape of the reflecting surface of an antenna reflector (reflector tuning) can be essential for a satellite reflector antenna to meet electrical performance requirements, usually requiring a shape accurate to within 0.004 inches RMS. The automated reflector tuning may include determining a set of characterization coefficients by precisely measuring the response of the reflector shape to actuator movements, and using the characterization coefficients in a mathematical analysis to determine optimal actuator movements to achieve a required shape of the reflector surface.

20 Claims, 7 Drawing Sheets

AUTOMATED REFLECTOR TUNING SYSTEMS AND METHDOS

TECHNICAL FIELD

Embodiments of the present disclosure generally relate to technology for manufacturing satellite antenna reflector dishes and, more particularly, to precisely adjusting the finished shape of each dish to achieve a specified level of performance from each dish.

BACKGROUND

In the manufacture of satellite antenna reflector dishes, fabrication of a reflector dish may begin with the layup of composite materials on a mandrel surface that provides a geometrical shape (such as a paraboloid) for what will become a reflecting surface or sub-surface for the reflecting surface (e.g., front side) of the reflector dish after the composite material sets and is removed from the mandrel. During the fabrication process, attachment points for fixing the reflector dish to a supporting structure (such as a spacecraft deploy arm structure) may be formed integral to or affixed to the opposite surface (e.g., back side) of the reflector dish. The precise shape of the reflecting surface, which is typically specified to have some pre-defined error tolerance, can be affected by the attachment of the reflector dish, via the attachment points, to the supporting structure. Such precision in shaping the reflecting surface can be required for the antenna to achieve the performance (e.g., focusing electromagnetic radiation of given frequency band) required of the antenna of which the reflecting surface is a component.

Prior to fixedly attaching the reflector dish to its supporting structure a tuning process is performed to precisely adjust the shape of the reflector dish so that the reflecting surface conforms to its required shape with the required degree of precision. This reflector tuning process is generally performed by hand in an iterative manner, requiring measuring and re-measuring the reflecting surface after each small set of positioning adjustments is made. The positioning adjustments and re-measuring rely heavily on human manual intervention (referred to as "touch labor") which can be time consuming and costly. For example, prior art methods of reflector tuning usually take approximately 10 to 15 days to complete. The manual, touch labor process is also susceptible to human error which greatly increases the variability in the tuning process cycle time. This variability can result in unpredictability of both the production time per part and the production cost.

Thus, there is a need in the manufacturing of satellite reflector antennas for a process that can provide benefits such as improving the tuning accuracy of each reflector yet increasing the production rate of reflector dishes while maintaining high product quality.

SUMMARY

In one or more embodiments, automated reflector tuning for a radio frequency (RF) dish antenna may be accomplished using a high precision measurement system employing photogrammetry coupled with data analysis processing for measuring position of the reflector surface. The tuning process may be driven by an optimizing control loop that utilizes the data obtained by the photogrammetry system to command micro actuators mounted at the reflector dish flexure points to adjust positioning of the reflector surface. Measurement of the reflector surface may be repeated to then iterate the adjustment process until a specified accuracy is achieved.

In one embodiment, a system for tuning a reflector includes: a number of actuators mechanically connected to attachment points of the reflector and supporting the reflector in such way that movement of the actuators affects a shape of a reflecting surface of the reflector; a photogrammetry system disposed for measuring the shape of the reflecting surface; a processor, in communication with the actuators and the photogrammetry system, that, when executing a reflector tuning process: causes movement of the actuators that adjusts the shape of the reflecting surface; receives a measurement of the shape of the reflecting surface from the photogrammetry system; and causes further movement of the actuators that adjusts the shape of the reflecting surface unless the measurement is within a specified accuracy for determining the shape of the reflecting surface.

In another embodiment, a method includes mechanically connecting a plurality of actuators to a plurality of attachment points of a reflector; electronically connecting the plurality of actuators to a computer processor; supporting the reflector by the mechanical connections to the actuators so as to change a shape of a reflecting surface of the reflector according to a movement of one or more of the plurality of actuators; optically measuring the shape of the reflecting surface; communicating data from the optical measurement of the shape of the reflecting surface to the computer processor; controlling, by the computer processor, movements of the plurality of actuators that adjusts the shape of the reflecting surface; receiving, by the computer processor, a measurement of the shape of the reflecting surface corresponding to the movements of the plurality of actuators; and indicating, by the computer processor, whether the corresponding measurement is within a specified accuracy of a required shape of the reflecting surface.

In a further embodiment, a non-transitory computer-readable medium includes instructions which, in response to execution by a computer system, cause the computer system to: receive data from a measurement, made by a photogrammetry system, of the shape of a reflecting surface of a reflector; control one or more movements of a plurality of actuators that adjust the shape of the reflecting surface; receive a corresponding measurement of the shape of the reflecting surface corresponding to the one or more movements of the plurality of actuators; and indicate, by the computer processor, whether the corresponding measurement is within a specified accuracy of a required shape of the reflecting surface.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

The present disclosure describes, in general, one or more embodiments of automated reflector tuning for shaping antenna reflector dishes for antennas such as those deployed on satellites and other electronics systems that may include, for example, communications and radar systems. Reflector shape adjustment (tuning) to a specified accuracy is generally required in order for a reflector antenna to meet its electrical performance requirements.

The automated reflector tuning exemplified by one or more embodiments of the present disclosure may be achieved through the use of a high precision measurement system that employs photogrammetry coupled with data analysis software for measuring position of the reflector surface. The tuning process may be driven by an optimizing control loop that utilizes the data obtained by the photogrammetry system to command micro actuators mounted at the reflector dish flexure points to adjust positioning of the reflector surface. Measurement of the reflector surface may be repeated to then iterate the adjustment process. In one or more embodiments, a manufacturing process is created that combines high precision measurement and positioning hardware with optimizing control software to produce a fully automated satellite reflector alignment tuning system. Furthermore, in one or more alternative embodiments, a generalization of the shape tuning manufacturing process could be useful for any application where automation of high precision object positioning is beneficial.

Prior art reflector tuning processes have involved an extensive degree of hand manipulation (touch labor) for positioning a reflector disk on a tooling table. Supports on the tooling table, for supporting the reflector above the tooling table, may be individually adjusted using a variety of shims of different thicknesses placed under each support and held in place by weights. Different shims are selected and positioned, or replace other shims, under the supports by hand using the weights as movable clamps for the shims during a repetitive process of measuring the reflector surface and readjusting (touch labor intervention) the shims and weights based on each new measurement of the reflector surface. Such a "touch labor" intensive reflector tuning process generally takes approximately 10 to 15 days to complete.

Using an automated reflector tuning process according to one or more embodiments, the reflector tuning cycle time can be reduced to less than one day (e.g., half a day), and, generally, the reflector tuning process can be completed in 1/10th to 1/20th of the time and at 1/20th the cost of the "touch labor" process. Thus, using a touch-free automated reflector tuning system in accordance with one or more embodiments, the reflector dish tuning process can generally be improved by an order of magnitude in both time and cost. Such an improvement may be equated to an over 90% reduction in tuning cycle time along with a 95% decrease in cost. In addition, automated, touch-free, reflector tuning in accordance with one or more embodiments, may, at the same time, maintain or improve product quality.

Figure 1:
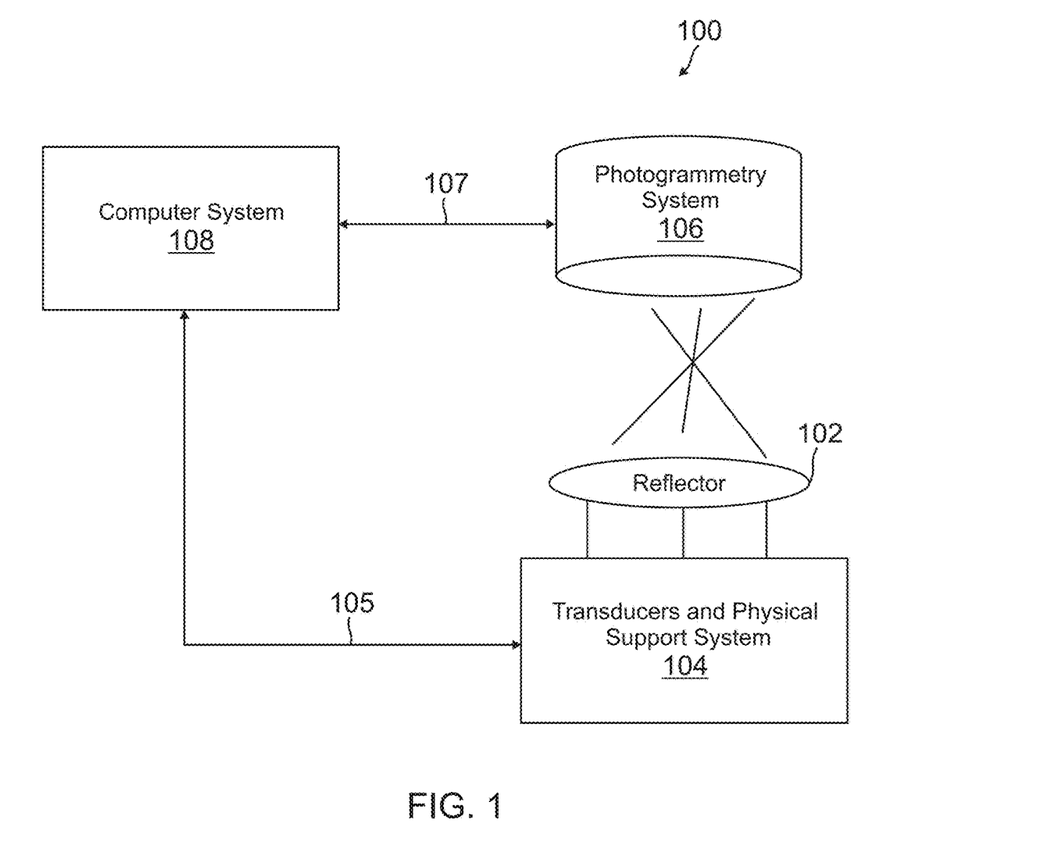
FIG. 1 is a system block diagram illustrating a system for automated reflector tuning for an RF antenna, in accordance with an embodiment of the disclosure.
Figure 2:
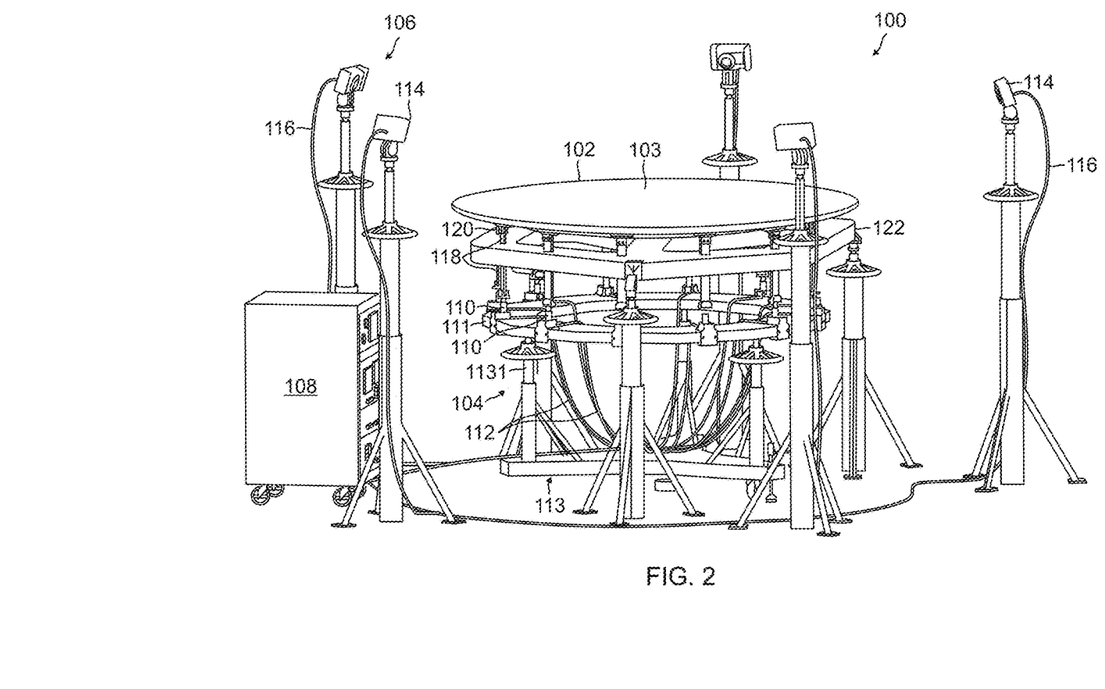
FIG. 2 is a perspective diagram physically illustrating various components of the system for automated reflector tuning shown in FIG. 1, according to an embodiment.

FIG. 1 shows a system block diagram of a reflector tuning system 100 for automated reflector tuning, in accordance with an embodiment, for example, of an RF antenna. FIG. 2 illustrates various physical components of the system 100 for automated reflector tuning. Referring to FIGS. 1 and 2, reflector tuning system 100 may include a reflector 102, a physical support system 104, a photogrammetry system 106, and a computer system 108. Computer system 108 may be in communication with photogrammetry system 106 via data signals 107 and with physical support system 104 via data signals 105 as indicated in FIG. 1. Photogrammetry system 106 may be disposed, as indicated in FIG. 1, to make precise measurements of the spatial location, relative to some chosen reference frame, of a reflecting surface 103 of reflector 102. Reflector 102 may be attached to physical support system 104, as indicated in FIG. 1, in such a way that precise distortions or changes to the shape of reflecting surface 103 of reflector 102 can be made by physical support system 104.

Physical support system 104 may include movement or positioning actuators for adjusting the exact or precise shape of reflecting surface 103 of reflector 102. For example, as shown in the embodiment illustrated in FIGS. 1 and 2, the actuators may include transducers 110, each of which may be in communication with computer system 108 using, for example, one of electrical cables 112 or other electronic means, such as wireless communication. Photogrammetry system 106 may include cameras 114, each of which may be in communication with computer system 108 (as seen in FIG. 2, for example) using, for example, one of electrical cables 116 or other electronic means. In an alternative embodiment, photogrammetry system 106 may have its own computer processor in communication with cameras 114 and in communication with computer system 108. As shown in FIG. 2, more than two cameras 114 may be used by photogrammetry system 106 to increase the accuracy of measurement of the reflecting surface 103 of reflector 102.

Each of transducers 110 may include a high precision servo mechanism, commanded by data signals 105 via electrical cables 112, for mechanical positioning of the reflecting surface 103 of reflector 102. Each transducer 110 may be a small linear displacement, high accuracy actuator that can be computer controlled for producing a small distortion of reflecting surface 103. By linear displacement is meant that the actuator movement may be limited to translation in one direction only, e.g., the z-direction of an x-y-z coordinate axis system. Displacement of each actuator may be accurate, for example, to within 0.0005 in.

Each transducer 110 may be supported, e.g., by being attached, on a structure, such as actuator support frame 111 that itself may be supported, as shown in FIG. 2, by a cradle 113 with adjustable vertical supports 1131. Each transducer 110 may be attached to a flexure 118, and each flexure 118 may be attached to a flexure attachment point 120 of reflector 102 so that transducers 110 support and fix or determine the shape of reflector 102. Each transducer 110 may move its actuator attachment point (e.g., attachment to a flexure 118) up and down vertically (e.g., z-direction of a typical x-y-z reference frame in which the x-y plane is horizontal) relative to the actuator support frame 111. Each transducer 110 may affect (e.g., change or distort) the shape of the reflecting surface 103 of reflector 102 by moving or exerting a mechanical force (either tension or compression) on a flexure 118 that acts through the respective flexure attachment point 120 on the back of reflector 102 to displace (e.g., move or reposition) a portion of the reflecting surface 103 on the front of reflector 102. It may be understood that a force exerted on reflector 102 at one flexure attachment point may be resisted (e.g., reacted to) by other forces acting at other flexure attachment points of reflector 102 depending on the distribution of stresses through the structure of reflector 102. For example, an increase in tension at one transducer 110 may be countered by compression acting at one or more of the remaining transducers 110 or even a combination of compression and tension acting at various transducers 110. Flexures 118 may pass through a reflector supporting structure, such as spacecraft deploy arm structure 122, and may be fixed (e.g. bonded) to spacecraft deploy arm structure 122 subsequent to final shaping of reflecting surface 103 at the conclusion of automated tuning of reflector 102. The final tuned shape of reflector 102 (e.g., the shape of reflecting surface 103) may then be securely fixed and held rigid for service as a component (along with spacecraft deploy arm structure 122) of a functioning antenna system.

Figure 3:
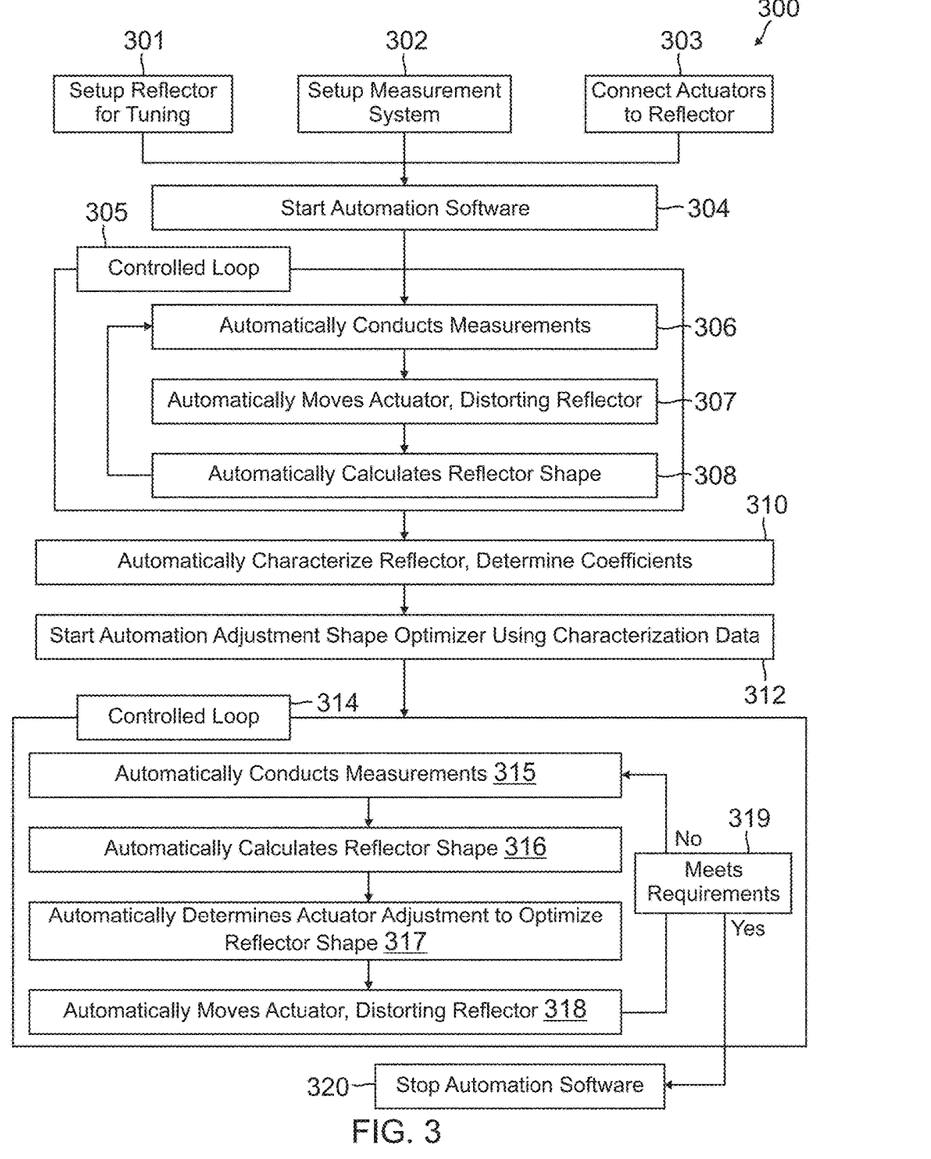
FIG. 3 is a flow diagram illustrating a method for automated reflector tuning, according to an embodiment.

FIG. 3 is a flow diagram illustrating a method 300 for automated reflector tuning, according to one embodiment. In general, an antenna reflector dish 102 starts from a mandrel (not shown) that is prepared for each differently shaped reflector. Each mandrel may be a custom shape according to a requirement that may be specified for it (referred to herein as "nominal" or "required" shape), using, for example, a three dimensional (3D) model and computer readable data such as an Initial Graphics Exchange Specification (IGES) file format. The mandrel shape, which may be identical to the reflecting surface 103 nominal shape, can be loaded using, for example, the IGES file format to computer system 108. The electronic data file may be used as a specification for the precise required shape of reflecting surface 103. For example, the IGES file may be used for comparison to photogrammetry measurements made by photogrammetry system 106 and for data analysis by computer system 108 for moving transducers 110 to adjust the shape of reflecting surface 103 to match the specification (nominal shape) to within a pre-defined RMS value.

The reflector 102 may be formed from graphite epoxy material that is laid up on the mandrel and when cured is pulled off the mandrel. At that point the reflector 102 may in general have a shape that is more or less close to the requirement (nominal shape) specified for it. In other words, there may be some error, or mismatch, expressed, e.g., as root-mean-square (RMS) value, between the specified shape and the actual (e.g., measured) shape of the reflector dish. The RMS value may calculated statistically on some particular number of data points for each particular reflector, as may be generally known. For example, a thousand or more data points, comprising specific positions on the face, or reflecting surface, of the reflector may be specified using the 3D model IGES data file specification for the reflector 102.

Typically, the required accuracy for the measured shape of the reflector is that the error be less than 0.004 in. RMS. When the measured shape of the reflector matches that of the specification from the 3D model to within (less than) a certain RMS value, e.g., less than 0.003 in. RMS, the reflector is said to be accurate to that RMS value. For this example, the reflector 102 (reflecting surface 103) would be said to be accurate to 0.003 in. RMS. Using automated reflector tuning method 300, according to one embodiment, a measurement accuracy less than 0.001 in. RMS on more than 4,000 data points has been achieved.

Method 300 may begin with initially setting up, 301, the reflector; setting up, 302, the measurement system; and connecting, 303, the actuators to the reflector. Initially setting up, 301, the reflector may include, for example, placing reflector 102 with reflecting surface 103 facing upwards above spacecraft deploy arm structure 122 with flexures 118 attached to flexure attachment points 120 and passing through (without touching) spacecraft deploy arm structure 122. Setting up, 302, the measurement system may include, for example, setting up three or more cameras 114 on adjustable height stands as seen in FIG. 2 and connecting electrical cables 116 from cameras 114 to computer system 108 for communication of data and control commands between computer system 108 and cameras 114 for operation of photogrammetry system 106. Connecting, 303, the actuators to the reflector may include, for example, connecting a flexure attachment fixture at the bottom of each flexure 118 to a connection fixture of each transducer 110, enabling each transducer 110 to provide a displacement force, which may be either compression or tension, to the flexure 118 connected to it.

Method 300 may continue with starting, 304, an automation software. Computer system 108 may include, for example, various monitors and human interface devices (HID) that may allow an operator to interact with reflector tuning system 100 for starting, stopping, pausing, obtaining status of various processes or data reports and files from reflector tuning system 100. At 304 a human operator may interact with an interface of reflector tuning system 100 displayed by computer system 108 to start an automated reflector tuning process, which may comprise controlled loop 305 as well as the additional processes of method 300 to be further described below.

Method 300 may continue with controlled loop 305 acting as an iterative process to repeatedly perform automatically conducting measurement, 306; automatically moving an actuator, 307; and automatically calculating the reflector shape, 308, until a control condition is satisfied. For example, each iteration of controlled loop 305 may processes an actuator by performing 306, 307, and 308 in which only the actuator being processed (e.g., a particular one of the 12 transducers 110 shown in FIG. 2) is moved during the process of automatically moving an actuator, 307, and the control condition may be, for example, that all of the actuators have been processed at least once. In other words, in this example, controlled loop 305 would be iterated 12 times, once for each of the 12 transducers shown in FIG. 1. Other examples of control conditions include that each actuator (e.g., transducer 110) may be processed for a set of incremental or specified movement values such as {−0.0015 in., −0.0010 in., −0.0005 in., 0.0000 in., +0.0005 in., +0.0010 in., +0.0005 in.}, repeating 306, 307, and 308 for each value at each transducer 110 in one example, or repeating 306, 307, and 308 for each transducer 110 at each value in another example. In other words, in each of these two examples, controlled loop 305 would be iterated 84 times.

Figure 5:
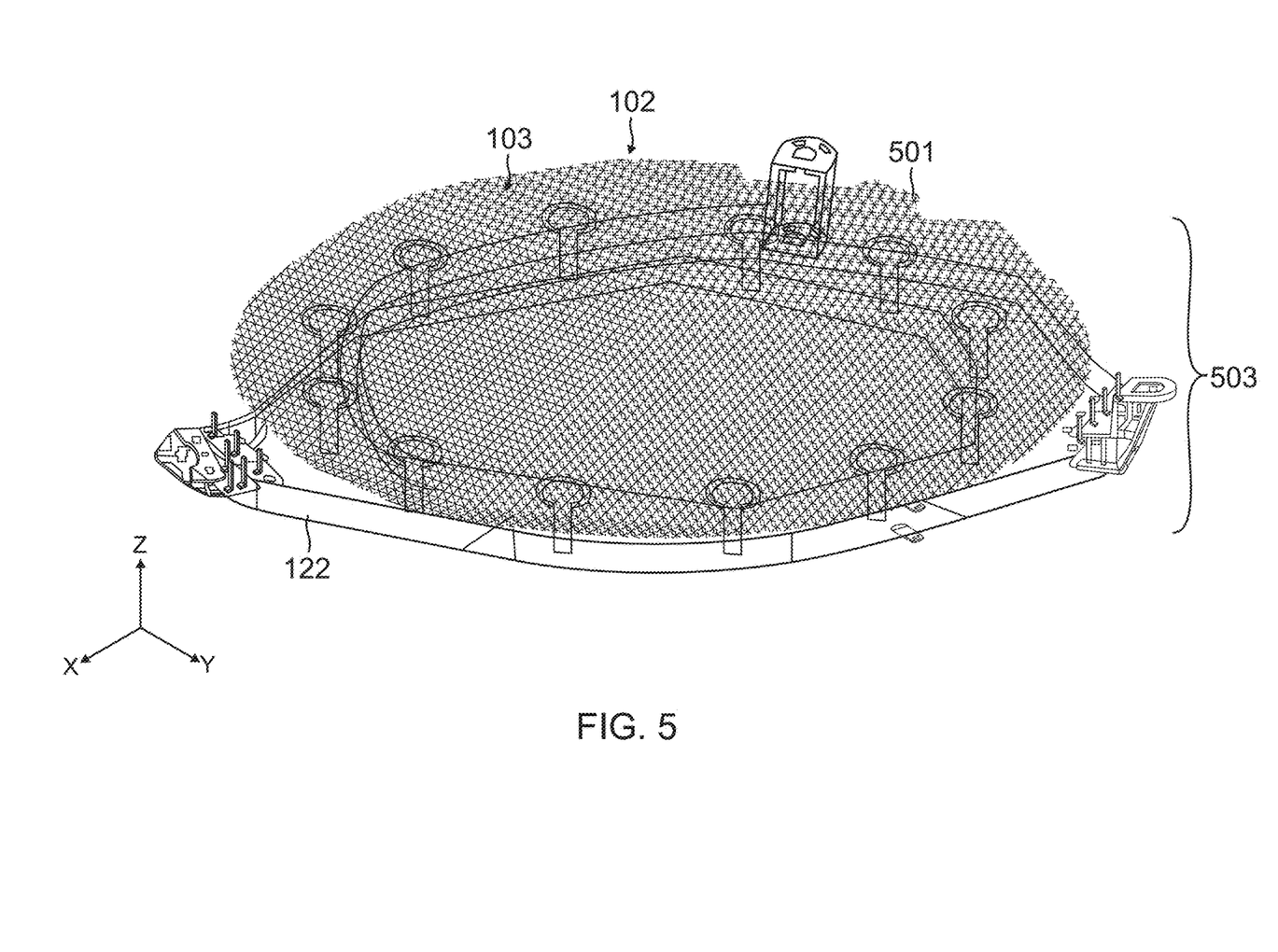
FIG. 5 is a visualization of reflector surface measured points superposed on an image of spacecraft deploy arm structure and showing flexure supports and attachment points to the reflector, according to an embodiment for automated reflector tuning.

Automatically conducting measurement, 306, may include photogrammetry system 106 automatically operating cameras 114, to provide a measurement for each point 501 of a chosen set 503 of points 501 on the reflecting surface 103 of reflector 102 as shown in FIG. 5. Automatically conducting measurement, 306, may further include, for example, photogrammetry system 106 sending camera data to a computer system, such as computer system 108, and the computer processing the camera data to calculate the measurement of the reflecting surface 103 at each data point 501 of the set 503 of points. For example, each data point 501 may be specified by its x-y position in a coordinate reference frame and the reflecting surface 103 measurement may be specified by its z position in the coordinate reference frame corresponding to the x-y position of the data point. As shown in FIG. 3, automatically conducting measurement, 306, may be performed prior to automatically moving an actuator, 307, after automatically moving an actuator, 307, or both before and after automatically moving an actuator, 307, although only the first example is shown in FIG. 3.

Automatically moving an actuator, 307, may include moving any specified one of the actuators (e.g., transducer 110) in a z-direction of the coordinate reference frame. For example, the twelve transducers 110 shown in FIG. 1 may be numbered as 1 to 12, and transducer 1 may be moved a specified amount. On the next iteration of controlled loop 305, transducer 2, may be moved a specified amount and so on. Each movement of each transducer may cause a distortion of reflecting surface 103 that may be measured by automatically conducting measurement, 306, using photogrammetry system 106.

Automatically calculating the reflector shape, 308, may be performed for each distortion caused by each movement of each actuator. By calculating the reflector shape from the reflecting surface 103 measurement that was taken during the process of automatically conducting measurement, 306, the effect of each movement of each individual actuator (e.g., a transducer 110 and the amount, positive or negative, it is moved by) may be isolated and used to characterize the response of reflecting surface 103 to individual actuator movement and combinations of actuator movements. Automatically calculating the reflector shape, 308, may provide, for example, a vector of values, each such vector describing a particular shape of reflecting surface 103.

Automatically characterizing the reflector, 310, may determine a set of coefficients that describes the response of reflecting surface 103 to the positioning of the actuators in terms of how the shape of reflecting surface 103, as described by one vector provided by automatically calculating the reflector shape, 308, changes to a possibly different shape, as described by a second vector provided by automatically calculating the reflector shape, 308, as the result movements of any combination of actuators by a specific amount for each actuator. So, for example, if an initial shape of reflecting surface 103 is known, and a combination of actuator movements (e.g., movement of a single transducer 110 by a specific distance, or movement of some combination of transducers 110 by a specific distance for each transducer 110) is provided, the set of coefficients provided by automatically characterizing the reflector, 310, may be used to predict the resulting shape of reflecting surface 103.

Method 300 may continue at start automated shape adjustment optimizer, 312, by passing process control to controlled loop 314 along with the set of coefficients for characterizing the reflector provided by automatically characterizing the reflector, 310. Start automated shape adjustment optimizer, 312, may also provide data such as the initial shape of reflecting surface 103 (e.g., as described by a vector provided by automatically calculating the reflector shape, 308). Start automated shape adjustment optimizer, 312, may also provide data such as the initial position of each of transducers 110.

Method 300 may continue with controlled loop 314 acting as an iterative process to repeatedly perform automatically conducting measurement, 315; automatically calculating the reflector shape, 316; automatically determining actuator adjustment, 317; automatically moving actuators, 318; and determining whether the reflector meets requirements, 319.

Automatically conducting measurement, 315, may include photogrammetry system 106 automatically operating cameras 114, to provide a measurement for each point 501 of a chosen set 503 of points 501 on the reflecting surface 103 of reflector 102 as shown in FIG. 5. Automatically conducting measurement, 315, may further include, for example, photogrammetry system 106 sending camera data to a computer system, such as computer system 108, and the computer system processing the camera data to calculate the measurement of the reflecting surface 103 at each data point 501 of the set 503 of points. For example, each data point 501 may be specified by its x-y position in a coordinate reference frame and the reflecting surface 103 measurement may be specified by its z position in the coordinate reference frame corresponding to the x-y position of the data point. As shown in FIG. 3, automatically conducting measurement, 315, may be performed prior to automatically moving actuators, 318. Automatically conducting measurement, 315, also may be performed prior to determining whether the reflector meets requirements, 319, and may correspond to a most recent performance of automatically moving actuators, 318.

Figure 4:
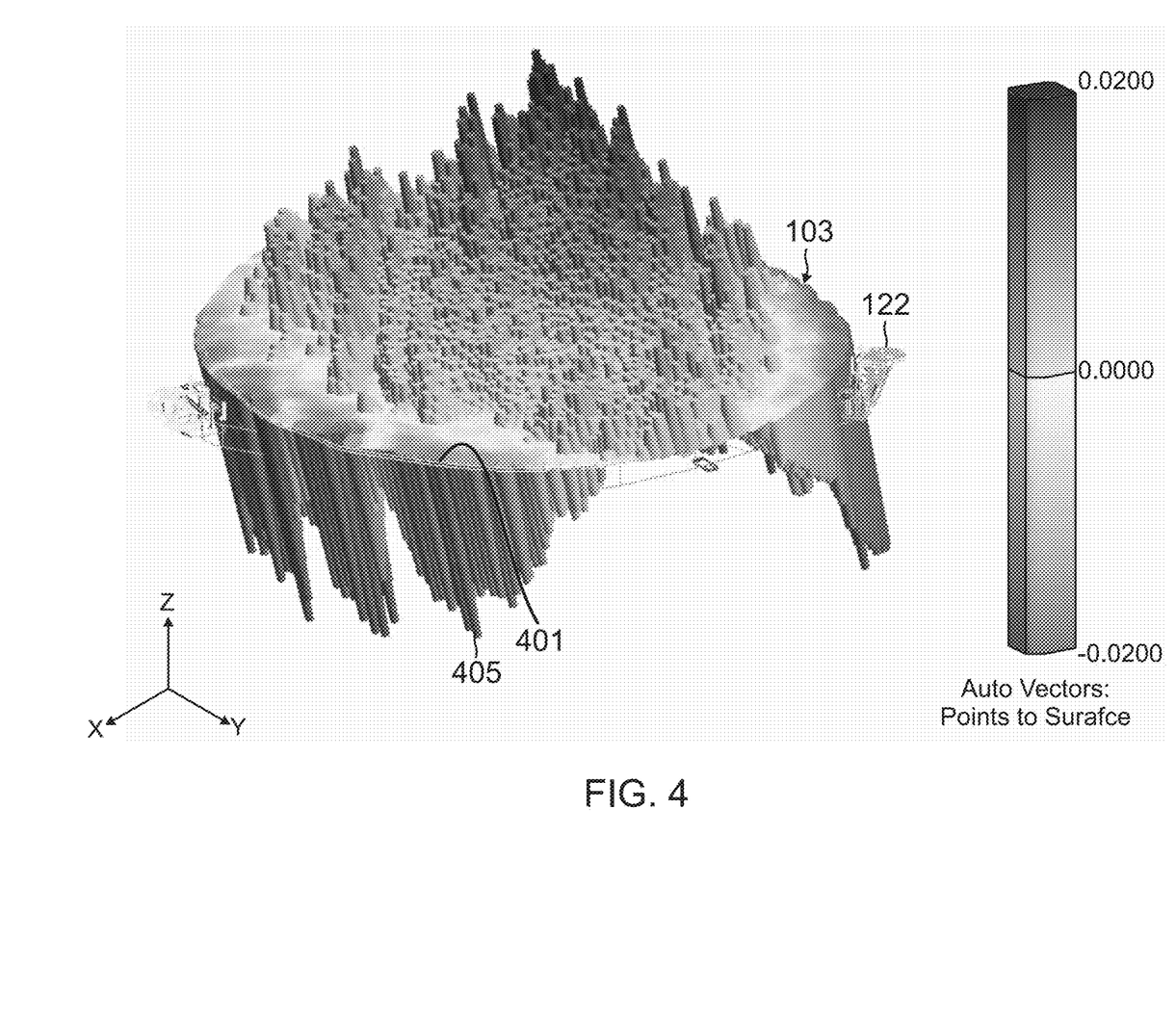
FIG. 4 is a visualization of reflector error to required shape superposed on an image of reflector dish surface and spacecraft deploy arm structure for automated reflector tuning, according to an embodiment.
Figure 6:
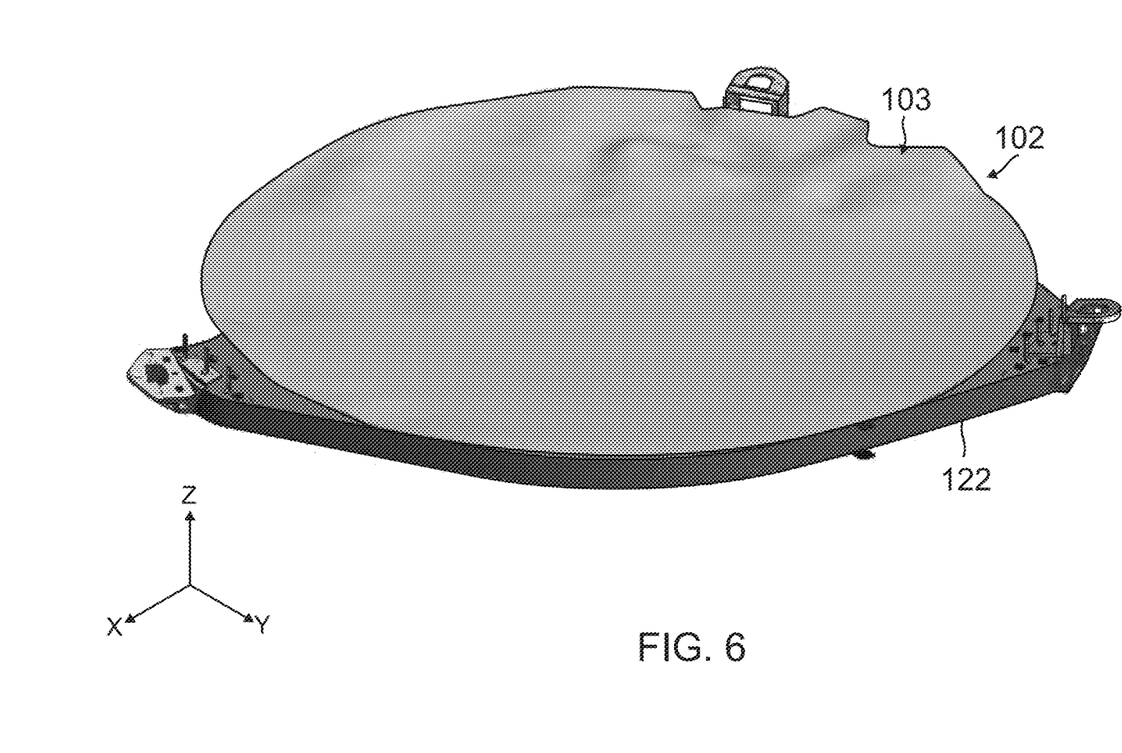
FIG. 6 is a perspective view illustrating a reflector normal surface to adjust measured points to and showing the spacecraft deploy arm structure supporting the reflector, according to an embodiment for automated reflector tuning.

Automatically conducting measurement, 315, may further include, for example, determining an error measure 405 (also referred to as a delta z value or a "whisker") for each data point 401 as seen in FIG. 4. Each data point 401 shown in FIG. 4 may correspond directly to one of data points 501 of shown in FIG. 5. Each error measure 405, delta z value, may be calculated as the difference between the required or nominal z value for reflecting surface 103 and the "actual" or measured z value for reflecting surface 103 determined by automatically conducting measurement, 315. If, for example, the shape of reflecting surface 103 were a perfect match to the required or nominal surface specified, for example, by the IGES file, then all of the whiskers 405 seen in FIG. 4 would have zero height and FIG. 4 would show only the height or shape of reflecting surface 103, as seen in FIG. 6. In such a case, the square root of the sum of the squares of all of the whiskers (which may be either positive or negative, as shown in FIG. 4) divided by the number of whiskers (number of data points 401), generally defined as the root-mean-square or RMS value would be zero. When it is not possible to achieve such a zero RMS value, the shape of reflecting surface 103 is said to be optimized if the RMS value for reflecting surface 103 can be minimized over a range of actuator adjustments.

Automatically calculating the reflector shape, 316; may be performed by calculating the reflector shape from the reflecting surface 103 measurement that was taken during the process of automatically conducting measurement, 315. Automatically calculating the reflector shape, 316, may provide, for example, a vector of values, each such vector describing a particular shape of reflecting surface 103.

Automatically determining actuator adjustment, 317, to optimize reflector shape may be performed according to various strategies based on computations made using the characterization coefficients determined at automatically characterizing the reflector, 310, and that describes the response of the shape—as described by a first vector—of reflecting surface 103 to a change in the positioning of the actuators. For example, with transducers 110 numbered from 1 to 12, one example of specifying a change in the positioning of the actuators could be −0.001 in. at transducer 2, +0.0005 in. at transducer 3, and −0.0005 in. at transducer 11. The characterization coefficients and the change in the positioning of the actuators may be used to calculate a shape—as described by a second vector—of reflecting surface 103 after the change in the positioning of the actuators is performed. Conversely, knowing the current shape (e.g., first vector) of the reflecting surface 103, and the specified nominal or required shape (e.g., second vector) of the reflecting surface 103, and the characterization coefficients, the calculations may be manipulated (e.g., by solving vector equations or using numerical methods) to predict the actuator adjustment needed to change the current shape of reflecting surface 103 to the required shape of reflecting surface 103. In practice, the nominal shape of reflecting surface 103 may not be perfectly achieved in a single iteration of controlled loop 314. Multiple iterations may be performed that either improve the RMS value (measure of the difference between the current shape of reflecting surface 103 and the required shape of reflecting surface 103, as described above) or provide a search among possible adjustments to the shape of reflecting surface 103 until the RMS value becomes satisfactory by meeting a pre-defined specification or requirement. Alternatively, iterations of controlled loop 314 may be performed (either successively lowering RMS values or searching among shape adjustments for lower RMS values) so as to reach a minimal value of the RMS value, said to optimize the reflector 102 shape (shape of reflecting surface 103).

Automatically moving actuators, 318; may be performed according to the determination made at automatically determining actuator adjustment, 317, and may correspond to the measurement made at automatically conducting measurement, 315. For example, equations may be solved for a combination of transducer 110 movements, that according to the characterization coefficients for the reflector 102 (determined at automatically characterizing the reflector, 310) that will cause a response of reflector 102 shape that brings the shape of reflecting surface 103 closer to the nominal specification, e.g., lowers the RMS value. Movement of the actuators may be specified as a change in the position of, for example, each of transducers 110 as given in the example above, including positive change, negative change, or no, zero, change.

Determining whether the reflector meets requirements, 319, may include re-measuring the shape of reflecting surface 103 (as described at automatically conducting measurement, 315) and calculating a new RMS value for the shape of reflecting surface 103 (also as described at automatically conducting measurement, 315). If the RMS value is not lower than a specified requirement, controlled loop 314 may be processed over again (another iteration may be performed) as shown in FIG. 3. If the RMS value is lower than the specified requirement, method 300 may continue at stop automation software 320. In an alternative embodiment, for example, if the shape of reflecting surface 103 has been optimized (e.g., by minimizing the RMS value over a range of trial shapes that may, for example, be pre-specified or limited in number), method 300 may continue at stop automation software 320, but if the shape of reflecting surface 103 does not meet the optimization criteria method 300 may continue with further iteration of controlled loop 314.

Method 300 may proceed at stop automation software 320 by providing an output display to a human operator that the automated reflector tuning process has completed. Method 300 may continue with, for example, the flexures 118 being bonded (or otherwise affixed or attached) to spacecraft deploy arm structure 122 to securely, rigidly hold the reflector 102 in place to preserve the accomplished shape adjustment to the shape of reflecting surface 103. Alternatively, for example, it may be decided to perform additional optimizations, adjustments, or re-measurements of the shape of reflecting surface 103.

Figure 7:
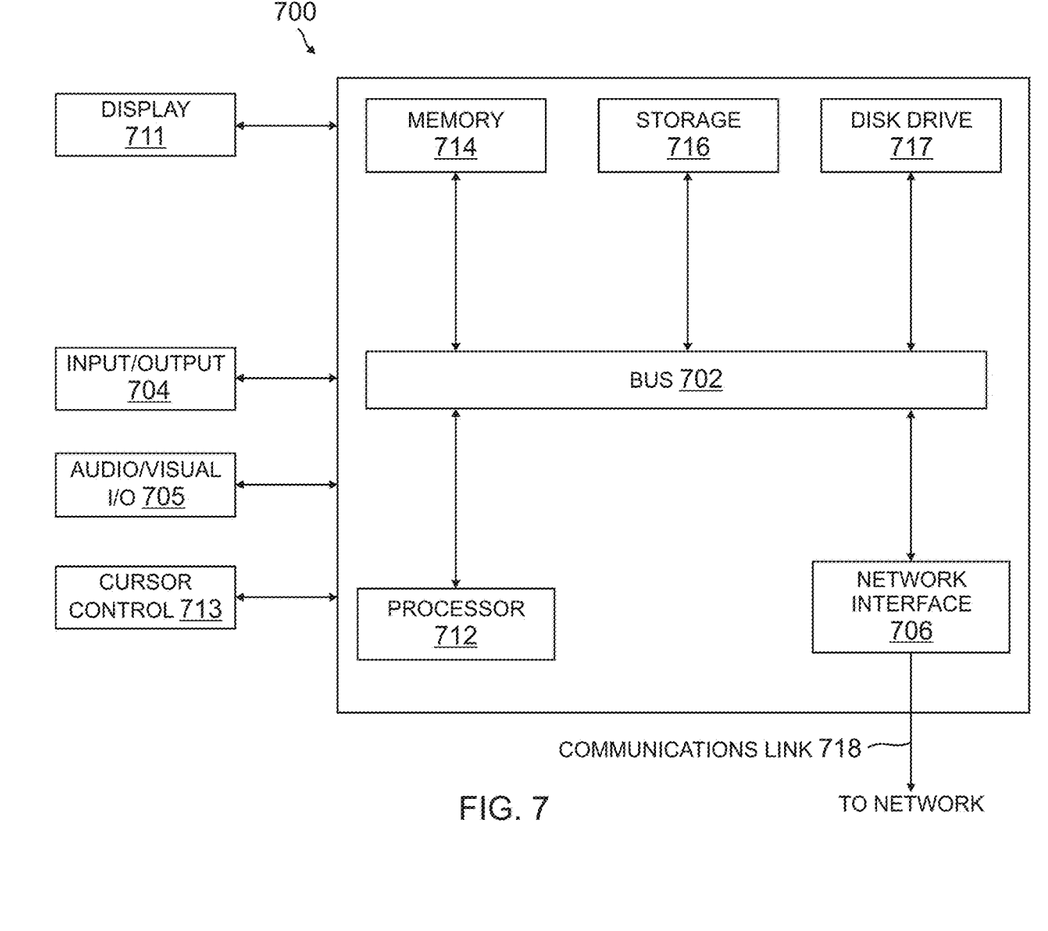
FIG. 7 is a block diagram of an example of a computer system suitable for implementing processing for a system for automated reflector tuning, according to an embodiment.

FIG. 7 is a block diagram of an example of a computer system 700 suitable for implementing data analysis or other software processing, such as photogrammetry analysis or position control processing, for a system for automated reflector tuning, according to one or more embodiments. Computer system 700 may include a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as photogrammetry system 106 or physical support system 104. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to a network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for tuning a continuous fixed-shape reflector, comprising:
a plurality of actuators mechanically connected to attachment points of the continuous fixed-shape reflector and supporting the continuous fixed-shape reflector such that movement of the actuators adjusts a shape of a continuous fixed-shape reflecting surface of the reflector;
a photogrammetry system disposed to measure the shape of the continuous fixed-shape reflecting surface;
a processor, in communication with the actuators and the photogrammetry system, that, when executing a reflector tuning process:
controls a movement of at least one of the actuators that adjusts the shape of the continuous fixed-shape reflecting surface;
receives a measurement of the shape of the continuous fixed-shape reflecting surface from the photogrammetry system; and
repeats the movement and measuring that adjusts the shape of the continuous fixed-shape reflecting surface unless the measurement is within a specified accuracy of a nominal shape of the continuous fixed-shape reflecting surface.

2. The system of claim 1, wherein the continuous fixed shape reflector further comprises a plurality of adjustable and fixable flexures, each flexure attached to one of the attachment points, and each actuator is connected via the corresponding flexure to the corresponding attachment point to adjust the shape of the continuous fixed-shape reflector, and wherein the flexures are fixable to a supporting structure of the continuous fixed-shape reflector such that, when fixed, a final tuned shape of the continuous fixed-shape reflector is maintained.

3. The system of claim 1, wherein:
the shape of the reflecting surface is specified by a plurality of data points provided in a computer readable data file.

4. The system of claim 1, wherein the processor is further configured to:
determine the nominal shape of the continuous fixed-shape reflector;
control a movement of at least one of the actuators to adjust the shape of the continuous fixed-shape reflecting surface to an initial shape based on the determination of the nominal shape;
determine a shape response of the continuous fixed-shape reflecting surface based on measuring a difference between the initial shape and the nominal shape of the continuous fixed-shape reflecting surface; and
using the shape response, determine a movement of at least one of the actuators needed to adjust the initial shape of the continuous fixed-shape reflecting surface closer to the nominal shape.

5. The system of claim 1, wherein the processor, when executing the reflector tuning process further causes an iterative process of incremental movements and measurements of the shape of the reflecting surface, each iteration of the iterative process comprising moving one of the actuators by a specified amount and measuring a corresponding shape response, each comprising a measurement of the shape of the reflecting surface with the photogrammetry system in response to the incremental movement; and
upon completion of the iterative process, further causes a data analysis of the incremental movements and corresponding shape responses to determine shape characterization coefficients for optimizing the shape of the reflecting surface.

6. The system of claim 1, wherein the processor, when executing the reflector tuning process further causes an iterative process of specified movements and corresponding measurements of the shape of the reflecting surface, each iteration of the iterative process comprising:
moving one or more of the actuators by an amount specified for each actuator and measuring a corresponding shape of the reflecting surface; and
determining whether the corresponding shape of the reflecting surface is within the specified accuracy for determining the shape of the reflecting surface.

7. The system of claim 1, wherein the processor, when executing the reflector tuning process further causes an iterative process of specified movements and corresponding measurements of the shape of the reflecting surface, each iteration of the iterative process comprising:

calculating, based on the measurement of the shape of the reflecting surface from the photogrammetry system and a set of shape characterization coefficients, a specified amount of movement for each actuator for optimizing the shape of the reflecting surface;

moving one or more of the actuators by the amount specified for each actuator and measuring a corresponding shape of the reflecting surface; and determining whether the corresponding shape of the reflecting surface is within the specified accuracy for determining the shape of the reflecting surface.

8. A method for automated reflector tuning, comprising:

mechanically connecting a plurality of actuators to a plurality of attachment points of a continuous fixed-shape reflector;

electronically connecting the plurality of actuators to a computer processor;

supporting the continuous fixed-shape reflector by the mechanical connections to the actuators so as to change a shape of a continuous fixed-shape reflecting surface of the continuous fixed-shape reflector according to a movement of one or more of the plurality of actuators;

optically measuring the shape of the continuous fixed-shape reflecting surface;

communicating data from the optical measurement of the shape of the continuous fixed-shape reflecting surface to the computer processor;

controlling, by the computer processor, movements of the plurality of actuators that adjusts the shape of the continuous fixed-shape reflecting surface;

receiving, by the computer processor, a measurement of the shape of the continuous fixed-shape reflecting surface corresponding to the movements of the plurality of actuators; and indicating, by the computer processor, whether the corresponding measurement is within a specified accuracy of a required shape of the continuous fixed-shape reflecting surface.

9. The method of claim 8, further comprising:

repeating the controlling, by the computer processor, further movements of the plurality of actuators and the receiving, by the computer processor, the corresponding measurement of the shape of the reflecting surface unless the corresponding measurement is within the specified accuracy.

10. The method of claim 8, wherein:

the optically measuring the shape of the reflecting surface comprises using at least three cameras; and data from the at least three cameras is analyzed to make a photogrammetric measurement.

11. The method of claim 8, further comprising:

iterating a process of specific movements of the actuators and corresponding measurements of the shape of the reflecting surface, each iteration comprising moving one of the actuators by a specified amount and measuring a corresponding shape response, each corresponding shape response comprising a measurement of the shape of the reflecting surface; and upon completion of the iterations, performing a data analysis of the movements and corresponding shape responses to determine a set of shape characterization coefficients for optimizing the shape of the reflecting surface.

12. The method of claim 8, further comprising:

iterating a process of specified movements of the actuators and corresponding measurements of the shape of the reflecting surface, each iteration comprising:

moving one or more of the actuators, wherein each actuator that is moved is moved by an amount specified for that actuator; and measuring a corresponding shape of the reflecting surface; and determining whether the corresponding shape of the reflecting surface is within the specified accuracy for determining the shape of the reflecting surface.

13. The method of claim 8, further comprising:

iterating a process of specified movements of the actuators and corresponding measurements of the shape of the reflecting surface, each iteration comprising:

calculating, based on the corresponding measurement of the shape of the reflecting surface and a set of shape characterization coefficients for the reflector, a specified amount of movement for each actuator for optimizing the shape of the reflecting surface;

moving one or more of the actuators, wherein each actuator that is moved is moved by an amount specified for that actuator; and measuring a corresponding shape of the reflecting surface; and determining whether the corresponding shape of the reflecting surface is within the specified accuracy for determining the shape of the reflecting surface.

14. The method of claim 8, further comprising:

specifying the required shape of the reflecting surface using a three-dimensional model including a plurality of data points provided in a computer readable data file.

15. The method of claim 8, wherein:

the specified accuracy is an RMS (root-mean-square) value specified for comparison to the required shape of the reflecting surface; and the specified accuracy requires the RMS (root-mean-square) value to be less than 0.001 inches over more than 4,000 data points.

16. A non-transitory computer-readable medium comprising instructions which, in response to execution by a computer system, cause the computer system to:

receive data from a measurement, made by a photogrammetry system, of the shape of a continuous fixed-shape reflecting surface of a continuous fixed-shape reflector;

control one or more movements of a plurality of actuators that adjust the shape of the continuous fixed-shape reflecting surface;

receive a corresponding measurement of the shape of the continuous fixed-shape reflecting surface corresponding to the one or more movements of the plurality of actuators; and indicate, by the computer processor, whether the corresponding measurement is within a specified accuracy of a required shape of the continuous fixed-shape reflecting surface.

17. The computer readable medium of claim 16, further comprising instructions to cause:

repeating the controlling of movements of the plurality of actuators and the receiving, by the computer processor, the corresponding measurement of the shape of the reflecting surface unless the corresponding measurement is within the specified accuracy.

18. The computer readable medium of claim 16, further comprising instructions to cause:
  iterating a process of specific movements of the actuators and corresponding measurements of the shape of the reflecting surface, each iteration comprising moving one of the actuators by a specified amount and measuring a corresponding shape response, each corresponding shape response comprising a measurement of the shape of the reflecting surface; and
  upon completion of the iterations, performing a data analysis of the movements and corresponding shape responses to determine a set of shape characterization coefficients for optimizing the shape of the reflecting surface.

19. The computer readable medium of claim 16, further comprising instructions to cause:
  iterating a process of specified movements of the actuators and corresponding measurements of the shape of the reflecting surface, each iteration comprising:
    moving one or more of the actuators, wherein each actuator that is moved is moved by an amount specified for that actuator; and
    measuring a corresponding shape of the reflecting surface; and
    determining whether the corresponding shape of the reflecting surface is within the specified accuracy for determining the shape of the reflecting surface.

20. The computer readable medium of claim 16, further comprising instructions to cause:
  iterating a process of specified movements of the actuators and corresponding measurements of the shape of the reflecting surface, each iteration comprising:
    calculating, based on the corresponding measurement of the shape of the reflecting surface and a set of shape characterization coefficients for the reflector, a specified amount of movement for each actuator for optimizing the shape of the reflecting surface;
    moving one or more of the actuators, wherein each actuator that is moved is moved by an amount specified for that actuator; and
    measuring a corresponding shape of the reflecting surface; and
    determining whether the corresponding shape of the reflecting surface is within the specified accuracy for determining the shape of the reflecting surface.

* * * * *

UNITED STATES PATENT AND TRADEMARK OFFICE
CERTIFICATE OF CORRECTION

PATENT NO. : 9,774,093 B2
APPLICATION NO. : 14/664382
DATED : September 26, 2017
INVENTOR(S) : Gary L. Glick et al.

Page 1 of 1

It is certified that error appears in the above-identified patent and that said Letters Patent is hereby corrected as shown below:

On the Title Page

Item (54), change "AUTOMATED REFLECTOR TUNING SYSTEMS AND METHDOS" to --AUTOMATED REFLECTOR TUNING SYSTEMS AND METHODS--.

In the Specification

In Column 1, Line 2, change "SYSTEMS AND METHDOS" to --SYSTEMS AND METHODS--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*